United States Patent [19]

Gillessen

[11] 4,367,471

[45] Jan. 4, 1983

[54] ARRANGEMENT FOR ACTUATING CONTROLLABLE DIODE ELEMENTS

[75] Inventor: Klaus Gillessen, Untergruppenbach, Fed. Rep. of Germany

[73] Assignee: Licentia Patent-Verwaltungs GmbH, Frankfurt am Main, Fed. Rep. of Germany

[21] Appl. No.: 240,546

[22] Filed: Mar. 4, 1981

[30] Foreign Application Priority Data

Mar. 6, 1980 [DE] Fed. Rep. of Germany ....... 3008565

[51] Int. Cl.[3] .......................... G01D 7/00; H04Q 9/00

[52] U.S. Cl. ............................... 340/825.82; 340/753; 340/782

[58] Field of Search ................... 340/825.82, 762, 782, 340/378.2, 753

[56] References Cited

U.S. PATENT DOCUMENTS

| | | | |
|---|---|---|---|
| 3,795,863 | 3/1974 | Umeda et al. | 340/753 |
| 3,877,017 | 4/1975 | Kawakami et al. | 340/825.82 |
| 3,898,642 | 8/1975 | Dorey et al. | 340/825.82 |
| 4,183,021 | 1/1980 | Gerstner | 340/753 |
| 4,198,629 | 4/1980 | Marion | 340/762 |

FOREIGN PATENT DOCUMENTS 2362681 6/1975 Fed. Rep. of Germany .

*Primary Examiner*—Donald J. Yusko
*Attorney, Agent, or Firm*—Spencer & Kaye

[57] ABSTRACT

In an arrangement for displaying information comprising antiparallel-connected pairs of a light-emitting diodes n supply lines are used to control 2n-3 pairs of diodes, the diodes being connected so that none of the lines cross.

9 Claims, 7 Drawing Figures

ARRANGEMENT FOR ACTUATING CONTROLLABLE DIODE ELEMENTS

BACKGROUND OF THE INVENTION

The present invention relates to an arrangement for actuating controllable elements, for example light-emitting diodes in an information display.

In many cases today, displays with light-emitting diodes (LED's) are used to display alphanumeric symbols and images with relatively low definition. These arrangements, which are called LED displays, have a number of advantages such as their low operating voltage, their rapid response time, the possibility of multiplex operation, a broad range of operating temperature, robustness and a long life span. The number of LED's required depends on the respective application. For a digit display (0-9) including a decimal point, for example, 8 LED's are required, 14-35 LED's are required for letter characters, 100 LED's are required for strip display with 1% definition and more than 1,000 LED's are required for a viewing screen.

A relatively large number of supply lines is generally required to control or trigger the LED's. If, for example, the cathodes of all of the LED's are connected together and if each diode is individually controlled, n supply lines are required to control n-1 diodes. In addition, there is the system of so-called matrix wiring which can control $n^2/4$ diodes with n supply lines.

Although matrix wiring reduces the number of supply lines, a relatively large number of supply lines is still required if there are very many LED's. The large number of supply lines required in many cases represents a serious problem in implementing diode displays. Moreover, in matrix wiring lines always cross and this is not advantageous.

SUMMARY OF THE INVENTION

The object underlying the invention is to provide an arrangement for displaying information which operates with as few supply lines as possible in order to control the display and in which no lines cross.

According to the invention there is provided an arrangement comprising a plurality of light-emitting diodes said diodes being arranged in 2n−3 pairs, where n is an integer greater than 2, the diodes of each pair being mutually connected in antiparallel, n supply conductors, said supply conductors being arranged to control said 2n−3 pairs of diodes, further conductors, said pairs of diodes being interconnected by said further conductors, wherein none of said conductors cross.

BRIEF DESCRIPTION OF THE DRAWINGS

The invention will now be described in greater detail, by way of example, with reference to the drawings of which.

DESCRIPTION OF THE PREFERRED EMBODIMENTS

Figure 1A:
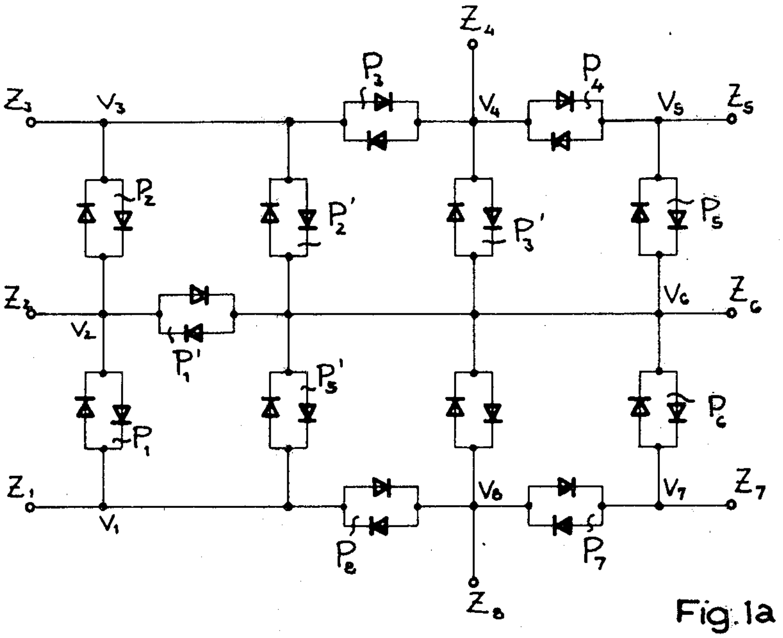
FIGS. 1*a–c* show three embodiments of the present invention.

In embodiments of the invention, the diode display has two groups of diode pairs, for example, in which the LED's of each diode pair are connected antiparallel of each other in each case. The diode pairs of the first group are connected together in a continuous chain to form a closed ring. In order to control the diode display, the connection points between the diode pairs in the first group are provided with supply lines. In the case of the second group of diode pairs in which the diodes are also connected antiparallel of each other, all of the diode pairs are connected at one of their two ends to a point which is located between two diode pairs of the chain of the first group. The other ends of the diode pairs of the second group are also connected to connection points between the diode pairs of the chain of the first group. However, this is implemented such that only one pair of diodes of the second group in each case is connected to such a connection point and such that there is no pair of diodes of the second group connected to the two connection points which are only separated from the connection point which serves as a common connection for the diode pairs of the second group by a single diode pair of the chain of the first group.

In other embodiments of the invention, a first group of diode pairs connected together in a continuous chain to form a closed ring is also provided, the connection points between the diode pairs of the chain also being provided with supply lines. Besides the first group of diode pairs, there is also a second group of diode pairs which forms a second chain which is a closed ring when there is an even number of diode pairs in the first chain and is not closed when there is an odd number of diode pairs in the first chain. Each diode pair of the second group is connected in parallel with a series circuit comprising two diode pairs of the first group in this diode display. In certain circumstances, a further or several further groups of diode pairs are provided. A further group of diode pairs is provided in each case where the number of diode pairs of the group which has the next but one larger number of diodes as compared to the further group is even and the group having the next larger number of diode pairs has more than three diode pairs. A further group is also provided in each case when the number of diode pairs of the group having the next but one larger number of diode pairs is an odd number and the number of diode pairs of the group with the next larger number of diode pairs is greater than two. If a further group is provided, this further group is connected to the group having the next larger number of diode pairs, when the number of diode pairs of the group having the next but one larger number of diode pairs is even, in the same way as the group having the next larger number of diode pairs is connected to the group having the next but one larger number of diode pairs. If the group with the next but one larger number of diode pairs has an odd number of diode pairs, however, the further group is connected to the chain comprising the group with the next larger number of diode pairs as compared to the further group and a diode pair from the group having the next but one larger number of diode pairs in the same way as the group having the next larger number of diode pairs is connected to the group with the next but one larger number of diode pairs. In all of the pairs of diodes of the second embodiment, the diodes of the diode pairs are also connected antiparallel of each other.

Besides the first and second embodiments, it is also possible to provide further embodiments which combine the first and second embodiments.

Referring now to the drawings FIG. 1*a* shows a diode display according to the invention having 8 supply lines and 13 pairs of diodes connected antiparallel to each other, i.e. a total of 26 diodes. In FIG. 1*a,* a first group of 8 pairs of diodes $P_1$ to $P_8$ can be seen in a continuous chain to form a closed ring. The connection points $V_1$ to $V_8$ between the diode pairs $P_1$ to $P_8$ are provided with 8 supply lines $Z_1$ to $Z_8$. Furthermore, a second group of 5 diode pairs $P_1'$ to $P_5'$ is provided. The diode pairs $P_1'$ to $P_5'$ are connected at their one end jointly to the connection point $V_6$ and therefore to the supply line $Z_6$. The common connection of the diode pairs $P_1'$ to $P_5'$ may also be connected to any other of the connection points $V_1$ to $V_8$ however. The other ends of the diode pairs $P_1'$ to $P_5'$ are in each case connected to another connection point and in fact diode pairs $P_1'$ is connected to a connection point $V_2$, $P_2'$ is connected to $V_3$, $P_3'$ is connected to $V_4$, $P_4'$ is connected to $V_8$ and $P_5'$ is connected to $V_1$. It can be seen that in each case one diode pair of the group $P_1'$ to $P_5'$ is connected to connection points $V_1$, $V_2$, $V_3$, $V_4$ and $V_8$. All of the 5 diode pairs $P_1'$ to $P_5'$ are connected to the connection point $V_6$, while none of the diode pairs of the group $P_1'$ to $P_5'$ are connected to connection points $V_5$ or $V_7$. These connection points $V_5$ and $V_7$ are separated from the common connection point $V_6$ by the diode pairs $P_5$ and $P_6$ of the first group.

Figure 1B:
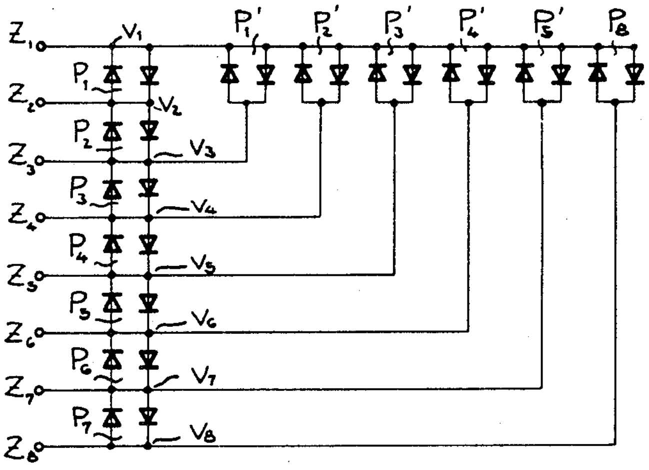

FIG. 1*b* shows a different embodiment of the invention in which, in contrast to the embodiment of FIG. 1*a,* the connection point $V_1$ is connected to all 5 diode pairs $P_1'$ to $P_5'$ of the second group. In other respects the embodiment of FIG. 1*b* corresponds to that of FIG. 1*a.*

Figure 1C:
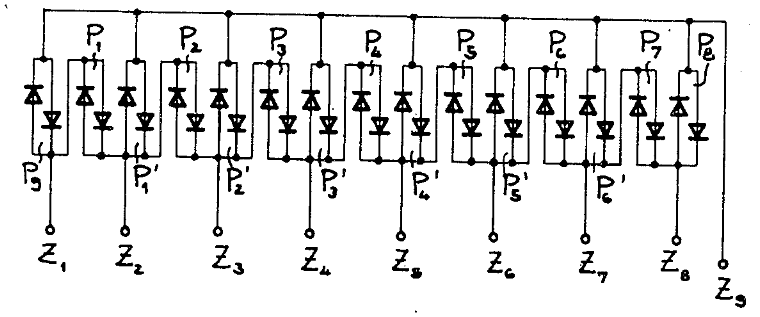

FIG. 1*c* shows a further embodiment of the invention in which the arrangement of diodes is selected so that a line arrangement is achieved. In this example, 9 supply lines $Z_1$ to $Z_9$ are provided, 9 diode pairs $P_1$ to $P_9$ of the first group, and 6 diode pairs ($P_1'$ to $P_6'$) of the second group, so that there are a total of 30 diodes.

Figure 2A:
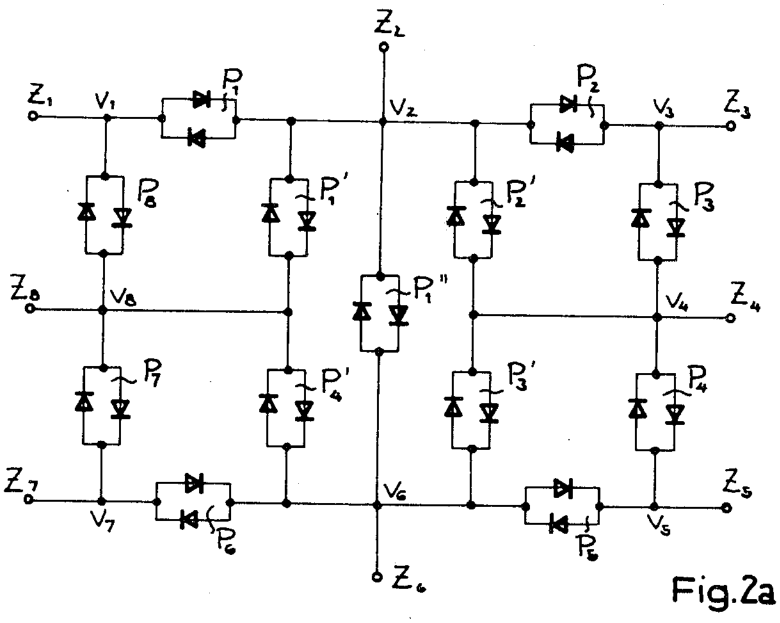
FIGS. 2*a–c* show three further embodiments of the present invention.
Figure 2B:
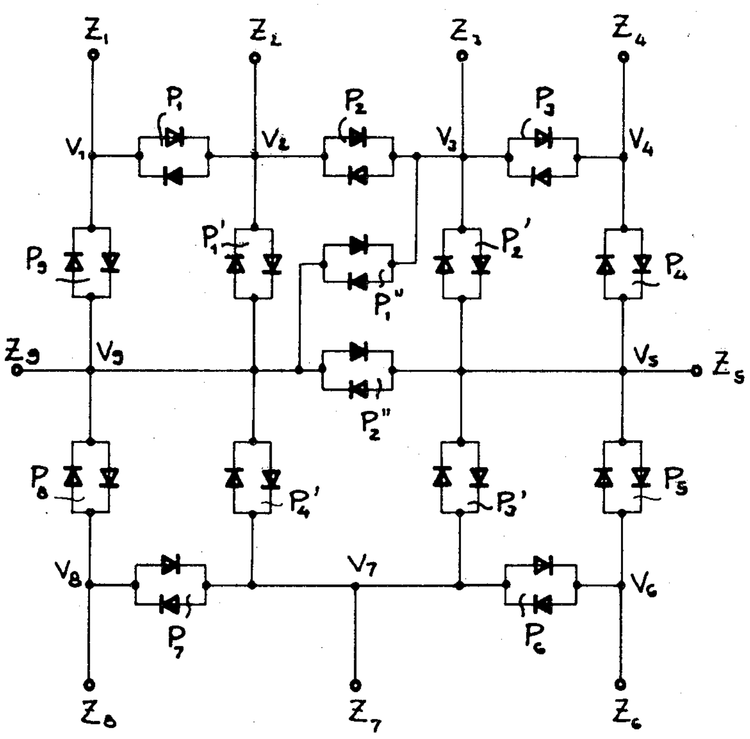
Figure 2C:
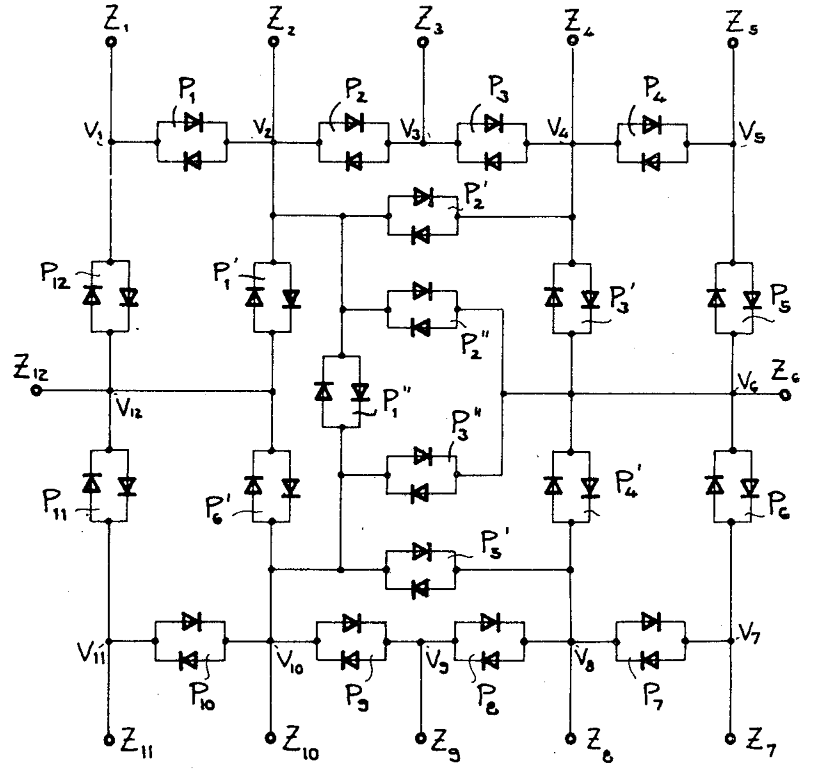

FIGS. 2*a* and 2*c* show further examples of embodiments of the invention in which the first group has an even number of diode pairs, while in the example of embodiment of FIG. 2*b* there is an odd number of diode pairs in the first group.

The arrangement of FIG. 2*a* shows a first group of diode pairs $P_1$ to $P_8$ which are connected together in a continuous chain to form a closed ring. Connection points $V_1$ to $V_8$ between the diode pairs $P_1$ to $P_8$ are provided with supply lines ($Z_1$ to $Z_8$). FIG. 2*a* also shows a second group of four diode pairs $P_1'$ to $P_4'$ which form a second closed ring because the first group has an even number of diode pairs. Each diode pair of the second chain is connected in parallel with a series circuit of two diode pairs of the first chain in each case, i.e. $P_1'$ is connected parallel to the series circuit comprising $P_8$ and $P_1$, P2' is connected parallel to the series circuit comprising $P_2$ and $P_3$, $P_3'$ is connected parallel to the circuit comprising $P_4$ and $P_5$, and $P_4'$ is connected parallel to the series circuit comprising $P_6$ and $P_7$. In the arrangement of FIG. 2*a,* a further group, i.e. a third group of diode pairs is provided because the conditions that the group with the next but one larger number of diode pairs as compared to the third group, i.e. the first group, has an even number of diode pairs and that the group with the next larger number of diode pairs, i.e. the second group (having four diode pairs) has at least four diode pairs are fulfilled. The third group has only one diode pair in the arrangement of FIG. 2*a,* however in the arrangement of FIG. 2*c* the third group has three diode pairs. The diode pair $P_1''$ of the third group is connected to the second group ($P_1'$ to $P_4'$) in the same way as the second group ($P_1'$ to $P_4'$) is connected to the first group ($P_1$ to $P_8$), i.e. $P_1''$ is connected in parallel to the series circuit comprising $P_1'$ and $P_4'$ and parallel to the series circuit comprising $P_2'$ and $P_3'$.

In the arrangement of FIG. 2*b,* a first group of nine diode pairs $P_1$ to $P_9$ is present, these diode pairs being connected together to form a closed ring chain. The connection points $V_1$ to $V_9$ between the diode pairs $P_1$ to $P_9$ are provided with supply lines. The arrangement of FIG. 2*b* also has a second group of four diode pairs $P_1'$ to $P_4'$, these diode pairs forming a second chain which is however not closed because the first group ($P_1$ to $P_9$) has an odd number of diode pairs. Each diode pair of the second chain ($P_1'$ to $P_4'$) is connected in parallel to a series circuit of two diode pairs of the first chain in each case and in fact $P_1'$ is connected parallel to the series circuit comprising $P_9$ and $P_1$, $P_2'$ is connected parallel to the series circuit comprising $P_3$ and $P_4$, $P_3'$ is connected parallel to the series circuit comprising $P_5$ and $P_6$ and $P_4'$ is connected parallel to the series circuit comprising $P_7$ and $P_8$. Besides the first and second groups, the arrangement of FIG. 2*b* also has a third group ($P_1''$ and $P_2''$) of diode pairs as a further group, because the group with the next but one larger number of diode pairs as compared to the third group, i.e. the first group ($P_1$ to $P_9$), has an odd number of diode pairs and because the group with the next larger number of diode pairs, i.e. the second group ($P_1'$ to $P_4'$), has four diode pairs, i.e. at least three diode pairs.

The group having the next but one larger number of diodes, i.e. the first group, has an odd number of diode pairs in the arrangement of FIG. 2*b.* Accordingly the diode pairs of the third group are connected to the diode pairs of a chain, which has yet to be defined, in the same manner as the diode pairs of the group with the next larger number of diode pairs is connected to the diode pairs of the group with the next but one larger number of diode pairs. Consequently, in the arrangement of FIG. 2*b* the diode pairs ($P_1''$ and $P_2''$) of the third group are connected to the diode pairs of a particular chain in the same manner as the diode pairs ($P_1'$ to $P_4'$) of the second group (group with the next larger number of diode pairs) are connected to the diode pairs ($P_1$ to $P_9$) of the first group, i.e. the group with the next but one larger number of diode pairs. The particular chain which is used to connect the diode pairs of the third group in the manner described comprises the second group ($P_1'$ to $P_4'$), i.e. the group with the next larger number of diode pairs, as compared to the further (third) group, and the diode pair ($P_2$) from the first group, i.e. the group with the next but one larger number of diode pairs as compared to the third group.

Since the diode pairs ($P_1''$ and $P_2''$) of the third group are connected to the chain formed from diode pairs (P1' to P4') of the second group and a diode pair ($P_2$) from the first group in the same way as the diode pairs ($P_1'$ to $P_4'$) of the second group are connected to the diode pairs ($P_1$ to $P_9$) from the first group, $P_1''$ is connected parallel to the series circuit comprising $P_1'$ and $P_2'$ and $P_2''$ is connected parallel to the series circuit comprising $P_3'$ and $P_4'$.

Figure 3:
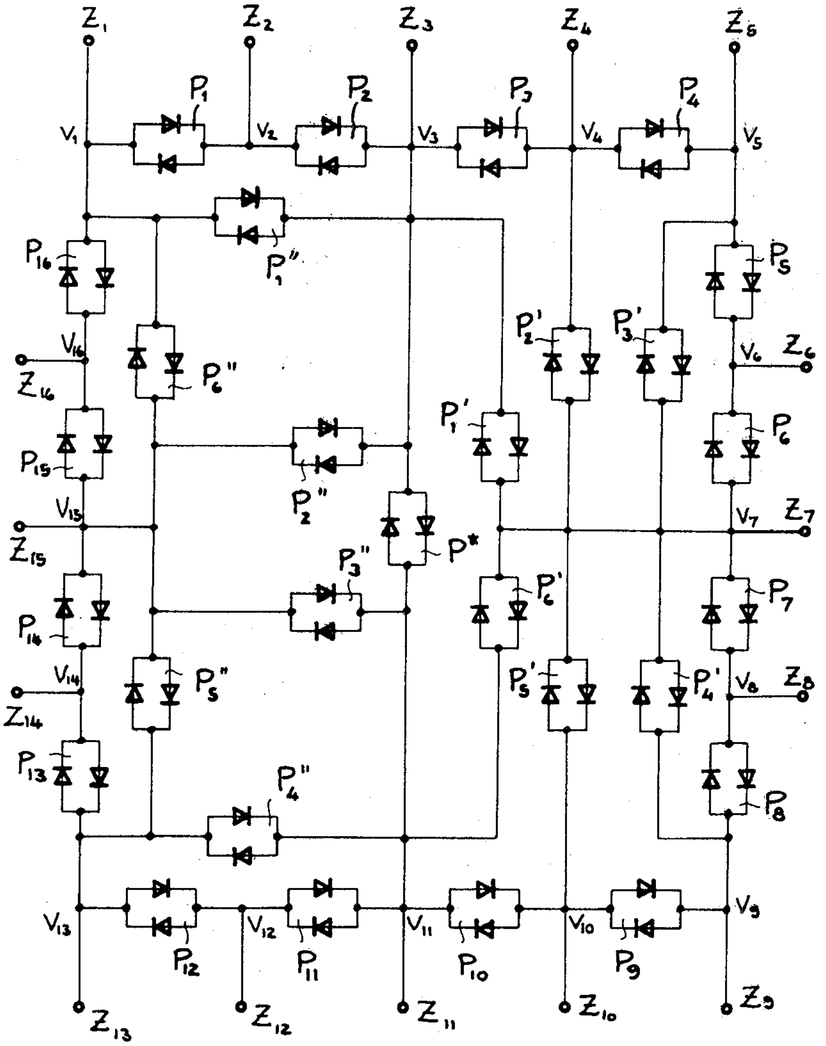
FIG. 3 shows another embodiment of the invention which combines features of the embodiments of FIGS. 1 and 2.

The arrangement of FIG. 3 represents a combination of the arrangements of FIGS. 1 and 2. The arrangement of FIG. 3 has 16 supply lines and 29 diode pairs. The arrangement of FIG. 3 has a first group of 16 diode pairs $P_1$ to $P_{16}$, which are connected together in a continuous chain to form a closed ring. The connection points $V_1$ to $V_{16}$ between the diode pairs $P_1$ to $P_{16}$ are provided with supply lines $Z_1$ to $Z_{16}$. Furthermore, the diode pair P* is provided which is connected to the connection points V3 and $V_{11}$. As a result, two new chains (second and third chains) are formed having the diode pair P* as their common link. The second chain is formed from the diode pairs $P_1$, $P_2$, P* and $P_{11}$ to $P_{16}$, while the third chain is formed from the diode pairs P* and $P_3$ to $P_{10}$.

In the arrangement of FIG. 3, a second group of 6 diode pairs $P_1'$ to $P_6'$ is provided besides the first group, this second group being connected in the manner shown in FIG. 1*a* to the chain formed from P* and $P_3$ to $P_{10}$. Finally, a third group of 6 diode pairs $P_1''$ to $P_6''$ is also provided and these diode pairs are connected in the manner shown in FIG. 2*b* to the chain formed from the diode pairs $P_1$, $P_2$, P* and $P_{11}$ to $P_{16}$.

The arrangements in accordance with the invention may of course have substantially more groups of diode pairs than is the case in the arrangements of FIGS. 1 to 3. This depends on the number of diode pairs of the first group. However, even for any desired number of groups of diode pairs, the features of the Claims still apply, since they are generally applicable. In the arrangement of FIG. 3, several diode pairs P* may also be provided so that the first chain is not only subdivided into two chains but into a plurality of chains. Instead of light-emitting diodes, other light-emitting components may be used or even completely different controllable elements.

It will be understood that the above description of the present invention is susceptible to various modification changes and adaptations.

What we claim is:

1. An arrangement comprising a plurality of light-emitting diodes, said diodes being arranged in 2n−3 pairs, where n is an integer greater than 2, the diodes of each pair being mutually connected in antiparallel, n supply conductors, said supply conductors being arranged to control said 2n−3 pairs of diodes, further conductors, said pairs of diodes being interconnected by said further conductors, wherein none of said conductors cross.

2. An arrangement as defined in claim 1 comprising a first group of pairs of diodes, said diodes being interconnected to form a closed chain, there being respective points of connection between mutually adjacent pairs of said diodes, said supply conductors being connected to said points of connection, a second group of pairs of diodes, each pair of said second group of pairs of diodes having a first and a second end, all said first ends being connected to a first of said points of connection, said second ends being connected to respective ones of the remaining said points of connection, wherein no more than one pair of diodes of said second group is connected to a single remaining said point of connection and wherein no pair of diodes of said second group is connected to the two said points of connection which are separated from said first point of connection by only a single pair of diodes of said first group.

3. An arrangement as defined in claim 1 comprising a first group of pairs of diodes, said pairs of diodes of said first group being interconnected to form a first closed chain, there being respective points of connection between mutually adjacent pairs of said diodes, said supply conductors being connected to said points of connection, there being an even number of pairs of diodes in said first group, a second group of pairs of diodes, said diodes of said second group being interconnected to form a second closed chain, wherein each diode pair of said second group is connected in parallel with a respective series circuit, said respective series circuit comprising in each case two of said diode pairs of said first group.

4. An arrangement as defined in claim 1 comprising a first group of pairs of diodes, said pairs of diodes of said first group being interconnected to form a first chain, said first chain being closed, there being respective points of connection between mutually adjacent pairs of said diodes, said supply conductors being connected to said points of connection, there being an odd number of pairs of diodes in said first group, a second group of pairs of diodes, said diodes of said second group being interconnected to form a second chain, said second chain not being closed, wherein each diode pair of said second group is connected in parallel with a respective series circuit, said respective series circuit comprising in each case two of said diode pairs of said first group.

5. An arrangement as defined in claim 3 or claim 4 comprising a further group of pairs of diodes, the number of diode pairs in that one of said first and second groups which has the next-but-one larger number of diode pairs compared with said further group being even, and the number of diode pairs in that one of said first and second groups which has the next larger number of diode pairs being at least four, wherein the diode pairs of said further group are connected to the diode pairs of said next larger group in the same way as the diode pairs of said next larger group are connected to the diode pairs of said next-but-one larger group.

6. An arrangement as defined in claim 3 or claim 4, comprising a further group of pairs of diodes, the number of diode pairs in that one of said first and second groups which has the next-but-one larger number of diode pairs compared with said further group being odd, and the number of diode pairs in that one of said first and second groups which has the next larger number of diode pairs being at least three, the diode pairs of said next larger group and a diode pair from said next-but-one larger group forming a third chain, wherein the diode pairs of said further group are connected to the diode pairs of said third chain in the same way as the diode pairs of said next larger group are connected to the diode pairs of said next-but-one larger group.

7. An arrangement as defined in claim 1 comprising a first group of pairs of diodes, said pairs of diodes of said first group being interconnected to form a first closed chain, there being respective points of connection between mutually adjacent pairs of said diodes, said supply conductors being connected to said points of connection, at least one further diode pair, said further diode pair being connected between two of said points of connection to form second and third closed chains, said second closed chain comprising diode pairs of said first group and said further diode pair, and said third closed chain comprising the remaining diode pairs of said first group and said further diode pair, a second group of pairs of diodes, each pair of said second group of pairs of diodes having a first and a second end, all said first ends being connected to a first of said points of connection, said first point of connection being in said second chain, said second ends being connected to respective ones of the remaining said points of connection, said remaining points of connection being in said second chain, no more than one pair of diodes of said second group being connected to a single remaining said point of connection and no pair of diodes of said second group being connected to the two said points of connection which are separated from said first point of connection by only a single pair of diodes of said second chain, a third group of pairs of diodes, each diode pair of said third group being connected in parallel with a respective series circuit, said respective series circuit comprising in each case two of said diode pairs of said first group, wherein said third group of pairs of diodes forms a fourth chain, said fourth chain being closed when the number of diode pairs in said third chain is even, and said fourth chain not being closed when the number of diode pairs in said third chain is odd.

8. An arrangement as defined in claim 7 comprising a further group of pairs of diodes, the number of pairs of diodes in the group with the next-but-one larger number of diode pairs compared with said further group being even, and the number of pairs of diodes in the group with the next larger number of diode pairs being at least four, wherein the diode pairs of said further group are connected to the diode pairs of said next larger group in the same way as the diode pairs of said next larger are connected to the diode pairs of said next-but-one larger group.

9. An arrangement as defined in claim 7 comprising a further group of pairs of diodes, the number of pairs of diodes in the group with the next-but-one larger number of diode pairs compared with said further group being odd, and the number of pairs of diodes in the group with the next larger number of diode pairs being at least three, the diode pairs of said next larger group and a diode pair from said next-but-one larger group forming a fifth chain, wherein the diode pairs of said further group are connected to the diode pairs of said fifth chain in the same way as the diode pairs of the next larger group are connected to the diode pairs of the next-but-one larger group.

* * * * *